United States Patent [19]

Bridigum

[11] 4,014,580
[45] Mar. 29, 1977

[54] EMERGENCY BRAKE VALVE DEVICE FOR RAILWAY VEHICLES

[75] Inventor: Robert J. Bridigum, Plum Borough, Pa.

[73] Assignee: Westinghouse Air Brake Company, Wilmerding, Pa.

[22] Filed: June 28, 1976

[21] Appl. No.: 700,383

[52] U.S. Cl. .................................. 303/82; 303/37; 303/69
[51] Int. Cl.² ........................................ B60T 17/04
[58] Field of Search ................. 303/32, 37, 38, 39, 303/40, 68, 69, 81, 82, 86

[56] References Cited

UNITED STATES PATENTS

| | | | |
|---|---|---|---|
| 2,417,209 | 3/1947 | McCune | 303/69 |
| 2,830,851 | 4/1958 | McClure | 303/38 |
| 2,926,965 | 3/1960 | Wilson et al. | 303/38 |
| 3,160,446 | 12/1964 | McClure et al. | 303/69 |
| 3,716,276 | 2/1973 | Wilson et al. | 303/82 |

Primary Examiner—Duane A. Reger
Assistant Examiner—Edward R. Kazenske
Attorney, Agent, or Firm—R. S. Visk; R. W. McIntire, Jr.

[57] ABSTRACT

An improved simplified emergency brake valve device including a relay valve portion responsive to brake pipe pressure reduction at an emergency rate for actuating a logic valve portion which, in turn, when actuated, causes operation of a vent valve portion via which the brake pipe is opened to atmosphere for effecting reduction of brake pipe pressure at an emergency rate at the succeeding car in the train, thereby propogating such reduction of brake pipe pressure throughout the train for effecting an emergency brake application thereon.

7 Claims, 1 Drawing Figure

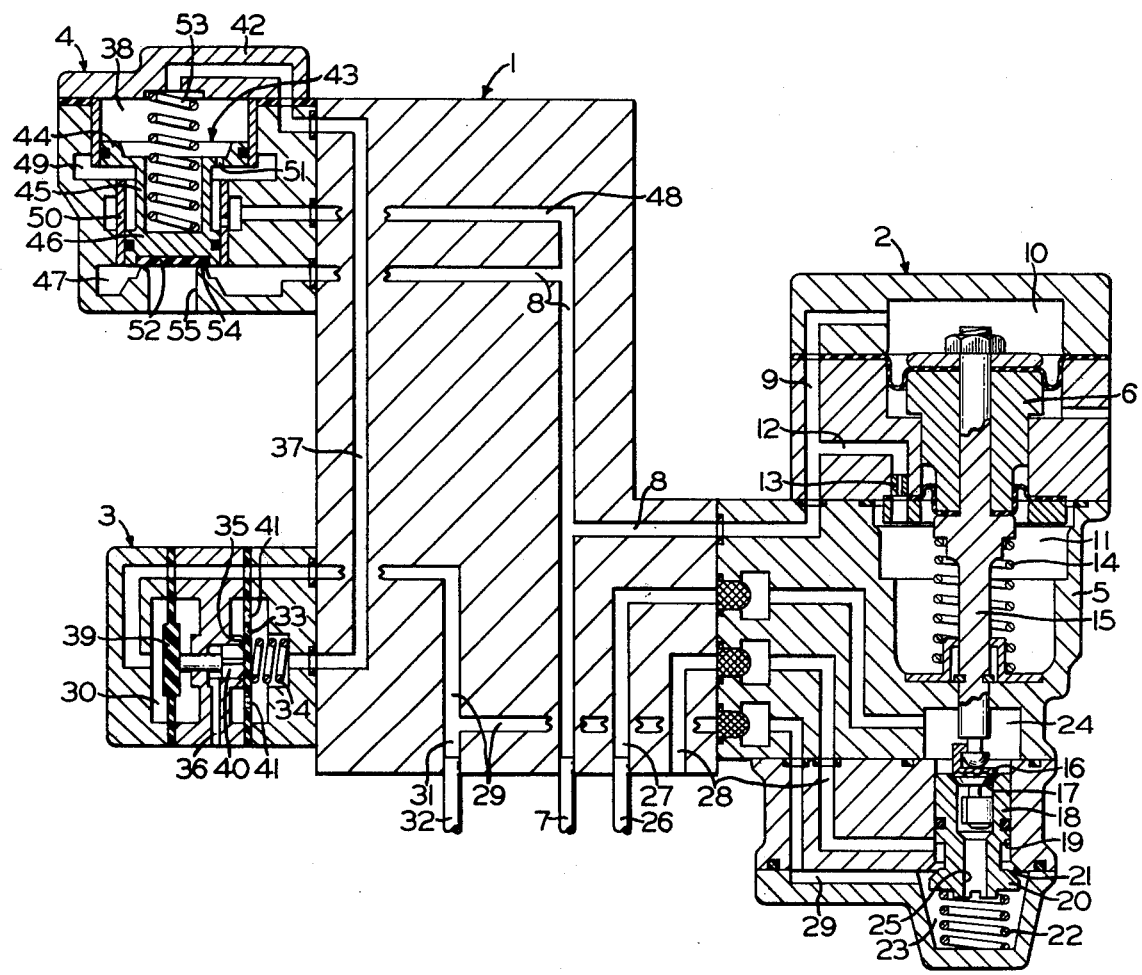

EMERGENCY BRAKE VALVE DEVICE FOR RAILWAY VEHICLES

BACKGROUND OF THE INVENTION

Due to the sophistocated nature of present railway vehicle braking equipment, the cost of such equipment has continued to increase so that there is a great urgency for simplification of such equipment in order to reduce the cost thereof. In the process of simplifying braking equipment for the purpose of reducing the cost, however, it is essential that such reduction in cost not be done at the expense of high standards of performance or efficiency of the equipment.

SUMMARY OF THE INVENTION

The object of the present invention is to provide an emergency brake valve device for railway vehicle braking systems, especially for rapid transit equipment, which valve device is characterized by simplified structure yet is capable of performing all the essential functions as performed by presently known emergency brake valve devices.

Briefly, the invention resides in an emergency brake valve device for rapid transit equipment, said emergency valve device comprising a relay portion including a differential piston subjected to brake pipe pressure, unrestrictedly, on a larger pressure side thereof and to the same pressure, through a choke, on an opposite smaller pressure side so as to be responsive to a reduction of said brake pipe pressure at a rate in excess of a certain rate (determined by said choke) for operating a valve via which actuating pressure is supplied to a logic valve portion, which, in response to said actuating pressure, operates to effect release of pressure acting on one side of an exhaust piston of a vent valve portion. When the exhaust piston is relieved of fluid pressure acting on the one side thereof, brake pipe pressure acting on the opposite side thereof causes the piston to open a vent valve via which the brake pipe pressure may escape at an emergency rate and thereby propogate, from car to car, an emergency brake application throughout the train.

BRIEF DESCRIPTION OF THE DRAWINGS

The single FIGURE drawing is a diagrammatic elevational view, in section, of an emergency brake valve device embodying the invention.

DESCRIPTION AND OPERATION

As shown in the drawing, the emergency brake valve device comprises a pipe bracket portion 1 to which are connected a relay valve portion 2, a logic valve portion 3, and a vent valve portion 4.

The relay valve portion 2 comprises a multi-section casing 5 in which an upper pressure area, as viewed in the drawing, of a reciprocably operable differential relay piston 6 is subjected unrestrictedly to brake pipe pressure from a brake pipe 7 via a brake pipe passageway 8 formed in bracket 1, and a brake pipe passageway 9 formed in casing 5 for connecting passageway 8 with a brake pipe pressure chamber 10 formed adjacent said upper pressure area of said piston. A lower pressure area of piston 6 is smaller than and disposed oppositely the upper pressure area and is subjected to brake pipe pressure in an adjacent equalizing chamber 11 connected to brake pipe passageway 9 via a branch passageway 12 in which a choke 13 of preselected flow capacity is interposed. A spring 14 disposed in chamber 11 assists pressure in said chamber in urging piston 6 axially upwardly, as viewed in the drawing.

A valve stem 15 extending coaxially from the lower side of piston 6 carries a supply valve 16 at the end thereof which is shown in a seated or closed position relative to a supply valve seat 17 formed on the adjacent end of an exhaust valve carrier 18 sealingly reciprocably disposed in a bore 19 formed in casing 5 below and in axial alignment with said piston stem and said supply valve. The end of valve carrier 18 opposite supply valve seat 17 carries an exhaust valve 20 which is shown in an open or unseated position relative to an exhaust valve seat 21 surrounding the lower end of bore 19. A return spring 22 compressedly disposed in a delivery-exhaust chamber 23 formed in casing 5 below valve carrier 18 serves to restore said valve carrier to a normal position in which exhaust valve 20 occupies a seated or closed position relative to valve seat 21.

Supply valve 16 controls communication between a supply chamber 24 formed in casing 5 above valve carrier 18 and a carrier passageway 25 extending coaxially through valve carrier 18 and surrounded at its upper end by valve seat 17. Supply chamber 24 is connected to a source of fluid under pressure, such as a fluid pressure supply pipe 26, via a supply passageway 27 formed partly in pipe bracket 1 and partly in casing 5.

Exhaust valve 20 controls communication between delivery-exhaust chamber 23 and an atmospheric exhaust passageway 28 formed partly in casing 5 and partly in pipe bracket 1. Delivery-exhaust chamber 23 connects with a delivery passageway 29 formed partly in casing 5 and partly in pipe bracket 1.

When brake pipe pressure is equalized in both chambers 10 and 11 of relay valve portion 2, or, at least, when the force of pressure acting on the upper pressure area of piston 6 exceeds the combined forces of spring 14 and pressure acting on the lower pressure area, said piston, stem 15, and supply valve 16, as a unit, assume a normal or exhaust position, in which, as shown, supply valve 16 is in its closed position for cutting off communication between supply chamber 24 and carrier passageway 25, and exhaust valve 20 is in its open position for opening communication between delivery-exhaust chamber 23 and exhaust passageway 28.

Delivery passageway 29 extends into logic valve device 3 and opens to an actuating chamber 30 formed therein which is normally vented to atmosphere via said delivery passageway, past open exhaust valve 20, and exhaust passageway 28. Delivery passageway 29 is also connected via a branch passageway 31, formed in pipe bracket 1, and a pipe 32 to a relay control valve (not shown) for a purpose to be hereinafter explained.

Logic valve device 3 comprises a diaphragm type relief valve member 33 which, in the absence of fluid pressure in chamber 30, is urged by a spring 34 to a closed or seated position relative to a valve seat 35 for closing off communication between an atmospheric vent 36 and a pressure release passageway 37 connected to a control chamber 38 of vent valve portion 4. When actuating chamber 30 is charged with fluid pressure, in a manner to be hereinafter disclosed, such pressure causes displacement of an operating diaphragm member 39 and a fluted valve stem 40 connected thereto. Displacement of valve stem 40, which has abutting contact with relief valve member 33, causes said valve member to be operated to an open or unseated position relative to valve seat 35 for opening communication between pressure release passageway 37 and atmospheric vent 36 via a plurality of perforations 41 provided in valve member 33 and past said unseated valve member.

Vent valve portion 4 comprises a casing 42 in which a differential piston 43 is reciprocably operable, said piston comprising a larger-diameter portion 44, with an upper pressure area adjacent control chamber 38, connected by a stem portion 45 to a smaller-diameter portion 46 having a lower pressure area portion adjacent an operating pressure chamber 47. Lower pressure area of smaller-diameter portion 46 is subjected unrestrictedly to brake pipe pressure in operating chamber 47, which is connected directly to passageway 8.

Upper pressure area of piston 43 is also subjected to brake pipe pressure prevailing in control chamber 38 which is charged with such pressure via a branch passageway 48 connecting passageway 8 with an annular charging chamber 49 formed partly between stem portion 45 of said piston and a bushing 50 fixed coaxially in said casing and adjacent the lower side of larger-diameter portion 44. Smaller-diameter portion 46, and therefore piston 43 itself, are sealingly reciprocably guided in bushing 50 which is of such axial length as to permit necessary axial movement of said piston. Control chamber 38 is connected to and charged with fluid pressure from charging chamber 49 via a choke 51 extending axially through and opening to both sides of larger-diameter piston portion 44 adjacent said control and charging chambers, respectively.

Smaller-diameter portion 46 of piston 53 carries an atmospheric valve element 52 on the lower pressure area thereof, which is urged by a spring 53 in control chamber 38, toward a closed or seated position relative to a valve seat 54 for cutting off communication between operating pressure chamber 47 and an atmospheric port 55. When valve element 52 is operated to an open or unseated position relative to valve seat 54, in a manner to be hereinafter set forth, chamber 47 is vented to atmosphere via port 55.

In considering the operation of the emergency brake valve device, let it be assumed that all parts are in the respective positions in which they are shown. If the operator desires to effect or initiate a brake application, he does so in conventional manner by causing a reduction of fluid pressure in brake pipe 7, which as those skilled in the art know, is normally charged at a certain predetermined pressure. The resulting degree of application, that is, either a service application or an emergency application, depends upon the rate at which reduction of pressure in brake pipe 7 is effected. The rate of reduction for a service brake application is less than that for an emergency application. At any rate, a reduction of pressure in brake pipe 7 is also reflected in chamber 10 of relay valve portion 2.

If the reduction of brake pipe pressure in chamber 10 is at the lesser service rate, choke 13 between said chamber 10 and equalizing chamber 11 is calibrated such as to accommodate equalizing flow of pressure, or breathing, between the two chambers at such a rate that the resulting differential pressure developed across opposite sides of piston 6 is insufficient to cause upward unitary movement of the piston, piston stem 15 and supply valve 16 out of their exhaust position, above defined, or, at least, to cause sufficient upward movement thereof for unseating said supply valve from valve seat 17 and permitting seating of exhaust valve 20 on valve seat 21. Thus, logic valve portion 3 and vent valve portion 4 remain unaffected by a service rate reduction of brake pipe pressure.

On the other hand, if the operator desires to initiate an emergency brake application, he causes pressure in brake pipe 7, and therefore in chamber 10, to be reduced at an emergency rate which cannot be accommodated by choke 13. Thus, with pressure in chamber 10 being reduced at a much more rapid rate than that in equalizing chamber 11, the resulting differential across the opposite sides of piston 6 is sufficient to permit the momentarily higher pressure in chamber 11 to move said piston, stem 15 and supply valve 16, as a unit, in an upwardly direction, as viewed in the drawing. Spring 22, acting on exhaust valve 20, urges said exhaust valve and carrier 18 to follow supply valve 16 until said exhaust valve seats in exhaust valve seat 21, thereby terminating upward movement of carrier 18 and supply valve seat 17. With upward movement of valve carrier 18 terminated, continued upward movement of piston 6 and valve stem 15 lifts supply valve 16 off valve seat 17.

With exhaust valve 20 in its seated position and supply valve 16 in its unseated position, actuating chamber 30 of logic valve portion 3 is cut off from atmosphere (via passageways 29 and 28) and is supplied with fluid pressure from supply pipe 26 via passageway 27, supply chamber 24, open supply valve 16, carrier passageway 25, delivery-exhaust chamber 23, and passageway 29. In the manner hereinbefore described, fluid pressure in chamber 30 causes unseating of valve member 33 and consequently venting of pressure from control chamber 38 of vent valve portion 4 via passageway 37.

When control chamber 38 of vent valve portion 4 is relieved of fluid pressure, choke 51 is effective in delaying recharging of said chamber from passageway 48, and therefore pressure in operating pressure chamber 47 is effective for operating piston 43 from a normal position, in which it is shown and in which valve element 52 is in its seated position (above defined), to a venting position in which said valve element is operated to its unseated position (above defined). With valve 52 in its unseated position, brake pipe 7 is opened unrestrictedly to atmosphere via passageway 8 and port 55, which thus speeds up reduction of brake pipe pressure on the adjacent vehicle also for causing successive operation, as above described, of an emergency vent valve device carried thereby for propogating the emergency brake application from car to car throughout the train.

When pressure in chamber 47 of vent valve portion 4 has reduced sufficiently for spring 53 to overcome such reduced pressure, piston 43 is immediately restored to its normal position to permit equalization of pressure in control chamber 38 and charging chamber 49. Eventually the respective pressures in chambers 10 and 11 of relay valve portion 2 also equalize to cause piston 6, stem 15, supply valve 16 and exhaust valve 20 to assume their respective normal positions in which they are shown. With exhaust valve 20 in its open position, chamber 30 of logic valve portion 3 is vented to atmosphere, and consequently spring 34 is effective in reseating valve 33 on seat 35 for cutting off chamber 38 from atmosphere via passageway 37. Thus, the several valves 16, 33, and 52 of the respective valve portions 2, 3, and 4 resume their respective normal or seated positions, except exhaust valve 20, which assumes its open position. These conditions will prevail until such time that a subsequent emergency application is initiated by the operator, notwithstanding that a brake application release may be effected in the usual manner by recharging brake pipe 7 to the certain predetermined pressure above noted. Such recharging of brake pipe 7 will not disturb the normal dispositions of the several valve portions 2, 3, and 4, since the increase in brake pipe pressure acts on the upper side of piston 6 in relay valve portion 2, and equalizes on both sides of smaller-diameter portion 46 of piston 42 in vent valve portion 4 to thereby retain supply valve 16 and valve element 52 of valve portions 2 and 4, respectively, in their respective seated positions.

As was herein previously noted, pipe 32, which is connected via branch passageway 31 to delivery passageway 29 may, for example, also be connected to a relay valve device (not shown) which, in response to a signal or control impulse provided by fluid pressure in delivery passageway 29 when delivered to actuating chamber 30 of logic valve portion 3, operates to effect supply of operating pressure to a brake cylinder (not shown) at a degree sufficient for an emergency application.

Having now described the invention, what I claim as new and desire to secure by Letters Patent, is:

1. An emergency brake valve device for railway vehicles of a train having a brake pipe normally charged with fluid at a certain pressure and effective upon reduction of the fluid pressure therein for initiating a brake application on the train, said emergency brake valve device comprising:
  a. a source of fluid under pressure;
  b. a vent valve portion connected to the brake pipe and having therein a control chamber normally charged with the fluid pressure of said brake pipe and including vent valve means operable, in response to release of the fluid pressure from said control chamber, from a normally closed position to an open position for venting the brake pipe to atmosphere;
  c. a logic valve portion having therein an actuating chamber normally vented to atmosphere and including relief valve means communicating with said control chamber of said vent valve portion and operable, in response to charging of said actuating chamber with fluid pressure from said source, from a normally closed position to an open position for venting said control chamber to atmosphere; and
  d. a relay valve portion including differential pressure means and control valve means for effecting alternative communication of said actuating chamber of said logic valve portion with atmosphere or said source of fluid under pressure, said differential pressure means also having oppositely disposed pressure sides of different dimensions communicated in parallel relation to the brake pipe, the larger side being subjected to the brake pipe pressure unrestrictedly and the smaller side being subjected to the brake pipe pressure restrictedly through a choke member via which said brake pipe pressure may be equalized on said oppositely disposed pressure sides,
  e. said differential pressure means and said control valve means normally occupying, as a unit, an exhaust position in which said actuating chamber is cut off from said source of fluid under pressure and communicated with atmosphere, and being operable responsively to a pressure differential across the two pressure sides effected by a brake pipe pressure reduction at a rate exceeding the flow rate capacity of said choke member, to a supply position in which said actuating chamber is cut off from atmosphere and communicated with said source of fluid under pressure.

2. An emergency brake valve device, as set forth in claim 1, wherein said differential pressure means comprises a relay piston having said larger and smaller pressure sides formed on respective opposite ends thereof adjacent a brake pipe pressure chamber and an equalizing chamber, respectively, connected in parallel relation with the brake pipe via a common brake pipe passageway in which said choke member is interposed between brake pipe and the equalizing chamber and between the two chambers.

3. An emergency brake valve device, as set forth in claim 1, wherein said control valve means comprises an exhaust valve and a supply valve operable, upon operation of the differential pressure means to said exhaust position, to open and closed positions, respectively, in which said actuating chamber of the logic valve device is cut off from said source of fluid under pressure and communicated with atmosphere, said exhaust and supply valves being operable, upon operation of the differential pressure means to said supply position, to closed and open positions, respectively, in which said actuating chamber is cut off from atmosphere and communicated with said source of fluid under pressure.

4. An emergency brake valve device, as set forth in claim 3, wherein said exhaust and supply valves are disposed in an axially spaced-apart alignment for effecting operation of said supply valve to its closed position in advance of operation of said exhaust valve to its said open position, upon operation of said differential pressure means to its said exhaust position, and for effecting operation of said exhaust valve to its said closed position in advance of operation of said supply valve to its said open position upon operation of said differential pressure means to its said supply position.

5. An emergency brake valve device, as set forth in claim 1, wherein said logic valve portion comprises:
  a. said relief valve means being operably interposed between an atmospheric vent and a pressure release passageway connected to said control chamber of the vent valve portion, said relief valve means normally occupying a closed position, in which communication between said pressure release passageway and said atmospheric vent is closed, and being operable to an open position in which said communication is opened;
  b. an operating diaphragm member operatively connected to said relief valve means by an axially aligned valve stem, said diaphragm member being disposed adjacent to and operable responsively to the fluid pressure supplied to said actuating chamber for operating said relief valve means to its said open position; and
  c. a spring for restoring said relief valve means to its said closed position upon venting of said actuating chamber to atmosphere.

6. An emergency brake valve device, as set forth in claim 1, wherein said vent valve portion comprises:
  a. a differential piston member having at one end thereof a first pressure area adjacent and subject to the pressure prevailing in said control chamber connected to the brake pipe pressure via choke means, and carrying at the opposite end thereof said vent valve means comprising a second pressure area smaller than said first pressure area adjacent and subject to pressure in an operating chamber connected directly and unrestrictedly to the brake pipe;

b. said differential piston member being effective, upon release of the fluid pressure from said control chamber, for operating said vent valve means to its said open position; and c. spring means effective, upon reduction of the brake pipe pressure in said operating chamber to a degree subservient to the compressive force of said spring means, for restoring said vent valve means to its said normally closed position.

7. An emergency brake valve device, as set forth in claim 6, wherein said vent valve portion is further characterized by a charging chamber from which said control chamber is charged with the fluid pressure via said choke means formed in the differential piston member, said charging chamber and said operating chamber being connected in parallel relation to the brake pipe via a common passageway.

* * * * *